United States Patent [19]
Kane

[11] 3,888,489
[45] June 10, 1975

[54] FISHING GAME

[76] Inventor: Rolland P. Kane, 42 Hadley Dr., Greenhills, Ohio 45218

[22] Filed: Feb. 6, 1974

[21] Appl. No.: 439,901

[52] U.S. Cl. ...... 273/134 B; 273/134 C; 273/134 D; 273/137 R
[51] Int. Cl. ............................................. A63f 3/00
[58] Field of Search ........................... 273/134, 135

[56] References Cited
UNITED STATES PATENTS
1,328,711  1/1920  Carr .......................... 273/135 AC
FOREIGN PATENTS OR APPLICATIONS
1,223,547  2/1960  France ......................... 273/135 AA

*Primary Examiner*—Delbert B. Lowe
*Attorney, Agent, or Firm*—David J. Richter

[57] ABSTRACT

A competition bass tournament fishing game having a playing surface, simulated fishing boats, fishing lures, pair of dice, and bass chance cards. The playing surface has 12 areas representing fishing holes which can be reached by rolling the dice. Any one of six lures can be selected and the dice are rolled to determine whether a strike occurs with that lure, which is determined by whether the score on the rolled dice matches a number assigned the lure. A base card is drawn if a strike occurs and the player's score is adjusted according to instructions on the card, which may include a bonus depending upon the player's fishing hole, lure, or other fishing situation at that time.

5 Claims, 11 Drawing Figures

FISHING GAME

FIELD OF INVENTION

This invention relates generally to a board game, and in particular to a game styled after a competition bass fishing tournament.

DESCRIPTION OF THE PRIOR ART

The prior art is replete with games wherein the players advance tokens in accordance with certain rules of play and wherein the operations of various everyday activities are taught through playing the game. But none of the prior art games teach the fundamentals of bass fishing terminology, fishing sites, and lures. In addition, the prior art does not teach the combination of individual selection and chance to determine the players' success or failure.

Accordingly, it is an object of this invention to provide a game wherein the basics of competition tournament bass fishing are taught.

It is a further object of this invention to provide a game wherein the language and terminology of competition tournament bass fishing are taught.

It is another object of this invention to provide a fast moving game combining elements of choice and chance.

Further objects and details of the invention will become apparent from the following Detailed Desription.

SUMMARY OF THE INVENTION

In accordance with one aspect of the invention, there is provided a game comprising a playing surface which has a plurality of playing locations thereon, each location being distinct from the other locations and having an identifier different from the others, chance means to determine by chance which of the plurality of playing locations is used for any one play of the game, the chances available on the chance means corresponding to the playing location identifiers, a plurality of playing pieces each of which is identifiable from the other pieces and therefore having an identifier associated therewith, a plurality of chance cards each of which has a result noted on it, and chance means for determining whether a chance card is obtained during any one play of the game and the chances available on the chance means corresponding to the playing pieces's identifiers, whereby a player of the game during his turn can determine by chance which playing location he must use and whether he gets a chance card.

In accordance with another aspect of the invention, there is provided a method of playing the above game comprising obtaining a playing location by chance, obtaining a playing piece, obtaining a playing piece identifier by chance, drawing a chance card if the playing piece identifier obtained by chance matches the playing piece obtained, and passing the play on to the next player if the playing piece identifier obtained by chance does not match the playing piece selected.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in connection with the accompanying drawings in which:

DETAILED DESCRIPTION OF THE INVENTION

Figure 1:
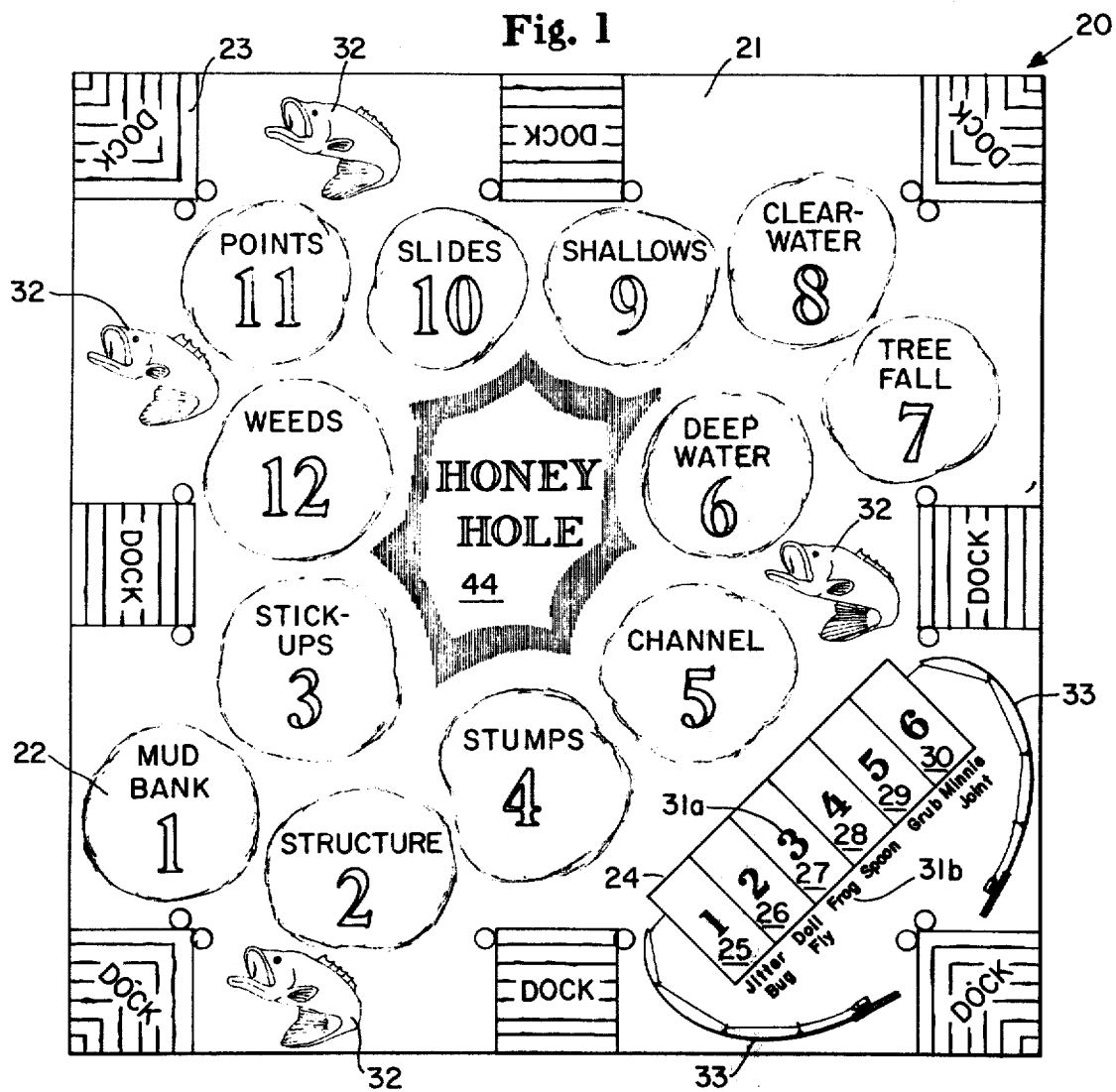
FIG. 1 is a plan view of the game board.

Turning first to FIG. 1 there is shown a game board 20 having a playing surface 21. The game board can be of stiff paperboard or other materials and can have ordinary lineaments for game boards such as 18 inches square as is well known in the game art. On the playing surface are twelve distinct and separated fishing holes, one of which is "Mud Bank" 22, sometimes referred to herein as playing locations. Each fishing hole has a separate and distinct identifier which can be a number or word description or both as is shown in FIG. 1, e.g., "Mud Bank" and "1". The playing surface also has a number of docks 23 which are sometimes referred to as non-playing locations. In addition, the playing surface has a Tackle Box 24 sometimes referred to as a playing piece keeping area, which is divided into more or less equal portions 25 to 30. Each portion is used as a keeping area for a specific fishing lure, examples of which are shown in FIGS. 5 to 10. Each portion has a fishing lure identifier which can be a number 31a or a description 31b such as the numeral "3" and the word "frog", respectively, for portion 27. Also the playing surface can have decorations thereon as desired, for example fish 32 and fishing rods 33.

Figure 2B:
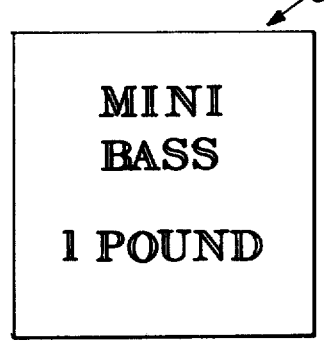
FIGS. 2a and 2b are opposite sides of a sample Bass Card.
Figure 2A:

Turning now to FIGS. 2a and 2b, there is shown a sample bass card 34, sometimes referred to herein as a chance card. FIG. 2b is the instruction side of the chance card and FIG. 2a is the front side of the chance card. The bass cards can be of many materials, an acceptable one being stiff paper like ordinary poker cards. The shape of the cards is not important, but they could be fish-shaped for this game. The various bass cards have different bass fishing results or instructions noted thereon, one such being shown in FIG. 2b. A pack of these cards is provided for the game, for example 24 or more cards. Additional bass fishing results which could be on different bass cards are as follows:

Slim Picken's — 2 pounds
Ole Hawg Jaw — 12 pounds
Lunker — 9 pounds
Your Stringer Broke — You lost your catch, lose all points
Your Boat is Leaking — Lose your bonus turn while you fix it
Mud Bank Special — 5 pounds, 4 pound bonus if fishing Mud Bank
Mystery Bass — roll the dice and your catch equals the total of the dice
Your opponents are cheating — take 5 pounds and your opponents each deduct 5 pounds
Slides Special — 5 pounds, 4 pound bonus if fishing the slides
Deep-water special — 5 pounds, 4 pound bonus if fishing No. 5 lure
This bass is too small — throw it back, no points
Shallows Special — 5 pounds, 4 pound bonus if fishing No. 6 lure
Clearwater Special — 4 pounds, 5 pound bonus if fishing clearwater Your Line Broke — Lose your bonus turn while you re-rig, no points Game Warden Caught you with an Illegal Bass — deduct 10 pounds Stump Jumper Special — 5 pounds, 4 pound bonus if fishing the stumps Channel Special — 5 pounds, 6 pound bonus if fishing No. 3 lure Stick-Up Special — 8 pounds, 5 pound bonus if fishing No. 2 lure Honey Hole Special — 10 pounds Tree Fall Special — 5 pounds, 5 pound bonus if fishing No. 4 lure Point Special — 8 pounds, 5 pound bonus if fishing No. 1 lure Structure Special — 5 pounds, 5 pound bonus if fishing structure You just lost a mystery bass — Roll the dice and deduct the total from your score The scoring notes on the bass cards are self-evident.

Figure 3:
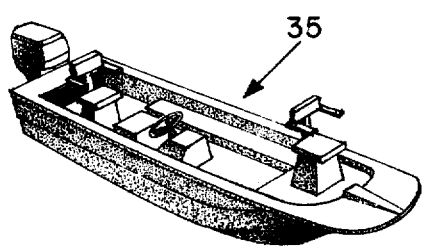
FIG. 3 is a perspective of a model bass boat.

Turning now to FIG. 3, there is shown a bass boat 35, sometimes referred to herein as a play locator. These boats can be of various construction, such as paper cutouts, molded plastic, wooden blocks, etc.

Figure 4:
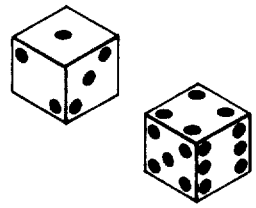
FIG. 4 is a perspective of a pair of dice.
Figure 5:
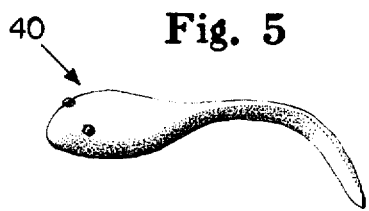
FIGs. 5-10 are perspectives of different fishing lures.
Figure 6:
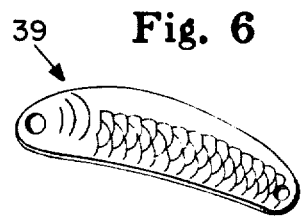
Figure 7:
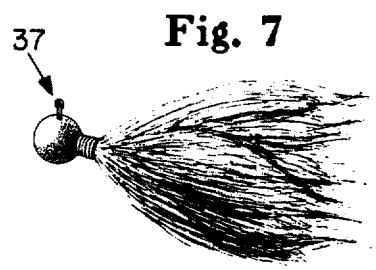
Figure 8:
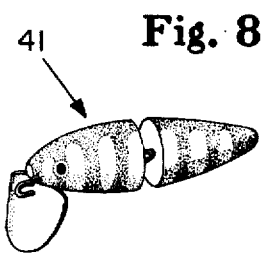
Figure 9:
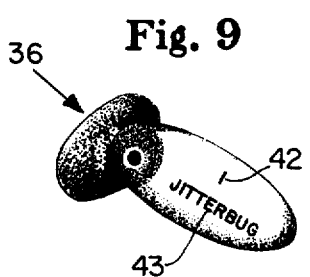
Figure 10:
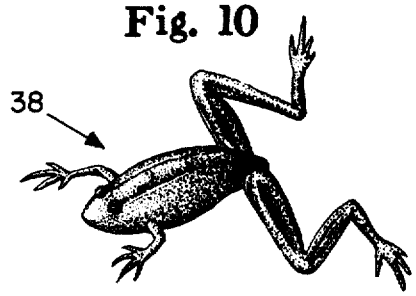

FIG. 4 shows an ordinary pair of dice. In the preferred embodiment, the dice provide the chance means and the score on the upfacing side of each die after the dice are rolled is used to locate a fishing hole with a similar number or to match the number on the fishing lures. Of course, dice having other indexes on their surfaces could be used as is readily apparent to those of ordinary skill in the game art; for example, a die could have a different picture or word description on each face which matches one of the fishing lures. This picture or word description would then be the fishing lure identifier on the die. Of course, other chance means could be used, one example being a spinnable wheel.

FIGS. 5 to 10 show various fishing lures, sometimes referred to herein as playing pieces, used in bass fishing, i.e., jitterbug 36, dollfly 37, frog 38, spoon 39, grub 40 and minnie joint 41. Each lure can be any of the various constructions such as mentioned with regard to the boats. Each lure has an identifier associated with it such as a number 42 or a description 43. For example, the lure of FIG. 9 has the number "1" and the description "jitterbug."

The object of the game is to catch more pounds of bass in a given time period, for example, one hour of play, or to be the first player to catch a given amount of bass, for example, 100 pounds. The player who catches the most pounds in a given time period or who catches a certain amount first, depending upon which game limit is chosen, is the winner.

To play the game, the bass cards are placed instruction side down on the Honey Hole 44 on the playing surface. The fishing lures are placed on the tackle box in the portion thereof associated with each lure. Each player selects a boat as his play locator and places his boat on a dock. Only one boat may be placed on any dock and it does not matter which dock any player is on. Each player then rolls the pair of dice once and the player that rolls the highest score starts the game.

The first player then obtains a fishing hole. To do so he rolls the pair of dice to determine which fishing holes he can select to fish at. He has three choices. He can select his fishing hole from the group consisting of (1) the hole whose number corresponds to the score on one die, (2) the hole whose number corresponds to the score on the other die, or (3) the hole whose number corresponds to the total of the scores on both dice. That is, if the dice rolled turned up 2 and 3, the player could go to hole 2, 3, or 5 at his choice. The player places his boat on the fishing hole selected by him.

Once the player is on a fishing hole, he obtains a fishing lure and it is selected from the tackle box. This selection may be made purely by the choice of the player, but it is preferred that the lure be selected by rolling the dice again and choosing only from those lures whose identifier is in the group consisting of (1) the score on one die, (2) the score on the other die, or (3) the total of the scores on both dice. By this method, if a player rolled a 1 and a 3, he could chose 1, 3, or 4 lure. If he rolled a 4 and a 5, he could select only lure number 4 or 5 since there is no lure number 9. The player can then place the selected lure next to his boat to keep track of which lure he selected.

He then attempts to obtain by chance the identifier of the lure selected. To do so he rolls the dice again. If the total score on the dice or the score on either die is the same as the number of his lure, he has a strike. A strike is of course when a fish takes the bait. When a player gets a strike, he is entitled to draw one bass card from the top of the pack of bass cards. If he rolls doubles on the dice and the score on each die matches the number of his lure, he is entitled to draw two bass cards.

If he does not roll a score which matches the number of his lure, he puts the lure back in the tackle box, leaves his boat at his fishing hole and passes the dice to the next player. His turn is complete.

Each time a player gets a strike and catches a bass — as noted on the bass cards — he gets a bonus turn. However, he cannot fish the same hole twice. He must play his bonus turn in the same manner as the original turn, i.e., obtain a fishing hole, obtain a lure, and determine whether he gets a strike.

As the game progresses and more players get on fishing holes, if all the holes a player could choose, as indicated by a roll of the dice, are occupied, he must return his boat to a dock and pass the dice and the play on to the next player.

A play of the game comprises obtaining a fishing hole if possible and proceeding through the turn to get a bass card. Each player's score is adjusted immediately after he receives a bass card according to the instructions on the card drawn. The pounds of bass indicated on the bass cards are added to the score of the player who drew the card. Of course, a player must also follow any other instructions given on a bass card he draws.

The game can be played by two to eight players, and it can be played as singles or as partners.

Thus, it is apparent that there has been provided, in accordance with the invention, a game and a method of playing the game that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications, and variations as fall within the spirit and broad scope of the following claims.

What is claimed is:

1. A game, comprising:

A. A playing surface, the playing surface having thereon a plurality of playing locations, each location being distinct from the other locations, each location having an identifier associated therewith, each identifier being different from the other identifiers;

B. Chance means for selecting by chance one of the playing locations, the chance means having a plurality of indexes, the indexes corresponding to the playing location identifiers;

C. A plurality of playing pieces, each piece adapted to be selectively moved to and placed adjacent any of the playing locations and being identifiable from the other pieces and therefore having an identifier associated therewith;

D. A plurality of chance cards, each card having a result noted on one side thereon, each card adapted to be placed upon the playing surface and stacked one on top of the other with the noted result face down; and E. Chance means for selecting by chance one of the playing pieces, the chance means having a plurality of indexes, the indexes corresponding to the playing pieces' identifiers identifiers.

2. The game of claim 1 including a plurality of non-playing locations and a playing piece keeping area on the playing surface, the keeping area being divided into as many portions as there are playing pieces, each portion have a playing piece identifier associated therewith.

3. The game of claim 2 wherein the game is a competition bass tournament fishing game, the non-playing locations being simulated boat docks, the playing locations simulating fishing holes, the keeping area representing a tackle box, the playing pieces being fishing lures, both chance means being dice, the chance cards having fishing results noted thereon, and the game including a plurality of model fishing boats, each boat being a play locator.

4. The game claimed in claim 1 including a chance card placement area on the playing surface and the results noted on the various chance cards being identified with certain of the various playing locations.

5. A fishing game, comprising:

A. A playing surface, the playing surface comprising: a plurality of areas simulating fishing holes, each fishing hole area being distinct from the other fishing hole areas, each fishing hole area having a discrete identifier associated therewith, a card placement area, an area simulating a tackle box, the tackle box area divided into a plurality of portions, and a plurality of areas simulating boat docks;

B. A plurality of model fishing boats, each boat being a play locator and being discretely identifiable, each boat adapted to be selectively moved between fishing hole areas and boat dock areas and to rest thereon;

C. A plurality of fishing lures, each lure adapted to be placed in the tackle box area and be selectively moved to and placed adjacent each of the fishing hole areas, each lure having a discrete identifier thereon and thus identifiable from the other lures;

D. A plurality of bass cards, each card having a fishing result inscribed on one side thereof, the plurality of cards being stackable in a deck and adapted to rest result side down in the card placement area of the playing surface, the various results inscribed on the various bass cards being identified with and corresponding to certain of the fishing hole areas; and E. Chance means for selecting by chance the identifier of a fishing lure, the chance means having a plurality of indexes, the indexes corresponding to the fishing lure identifiers.

* * * * *